US008588852B2

(12) United States Patent
Galaro et al.

(10) Patent No.: US 8,588,852 B2
(45) Date of Patent: Nov. 19, 2013

(54) METHOD AND APPARATUS FOR CONTROLLING A PHASED DEPLOYMENT OF A BASE STATION USING AN OPERATIONAL STATE OF A VEHICLE

(75) Inventors: Joseph L. Galaro, Holmdel, NJ (US); Thierry Etienne Klein, Fanwood, NJ (US); John F. Lertola, Lebanon, NJ (US); Raymond B. Miller, Belmar, NJ (US)

(73) Assignee: Alcatel Lucent, Paris (FR)

( * ) Notice: Subject to any disclaimer, the term of this patent is extended or adjusted under 35 U.S.C. 154(b) by 1543 days.

(21) Appl. No.: 11/863,405

(22) Filed: Sep. 28, 2007

(65) Prior Publication Data

US 2012/0214550 A1 Aug. 23, 2012

(51) Int. Cl.
*H04B 1/38* (2006.01)

(52) U.S. Cl.
USPC ........... 455/561; 455/420; 455/41.2; 340/989

(58) Field of Classification Search
USPC .......... 455/561, 420, 41, 418, 404.1; 340/989
See application file for complete search history.

(56) References Cited

U.S. PATENT DOCUMENTS

| 6,687,497 B1* | 2/2004 | Parvulescu et al. | 455/420 |
| 2005/0190080 A1* | 9/2005 | Flick | 340/989 |
| 2007/0082614 A1* | 4/2007 | Mock | 455/41.2 |
| 2007/0100513 A1* | 5/2007 | Asano | 701/2 |

OTHER PUBLICATIONS

"911-NOW: A Network on Wheels for Emergency Response and Disaster Recovery Operations," David Abusch-Magder et al, Bell Labs Technical Journal, Special Issue: Wireless Network Technology Issue Edited by Joseph A. Tarallo and James S. Peterson; published by Wiley InterScience; vol. 11, Issue 4, pp. 113-133, Mar. 9, 2007.

* cited by examiner

*Primary Examiner* — David Q Nguyen
(74) *Attorney, Agent, or Firm* — Wall & Tong, LLP

(57) ABSTRACT

The invention includes a method and apparatus for controlling the operational state of a base station mounted on a vehicle based on the operational state of the vehicle. A method includes monitoring an operational state of the vehicle and switching the base station from a first operational state to a second operational state in response to the operational state of the vehicle switching from a first operational state to a second operational state.

24 Claims, 8 Drawing Sheets

US 8,588,852 B2

METHOD AND APPARATUS FOR CONTROLLING A PHASED DEPLOYMENT OF A BASE STATION USING AN OPERATIONAL STATE OF A VEHICLE

FIELD OF THE INVENTION

The invention relates to the field of communication networks and, more specifically, to wireless networks.

BACKGROUND OF THE INVENTION

Emergency response organizations increasingly depend on wireless communication technology to provide communication during emergencies. Disadvantageously, however, emergencies often result in damage to, or sometimes even destruction of, existing network infrastructure, thereby preventing communications between emergency personnel. In other words, the existing communications infrastructure lacks survivability. Furthermore, even if portions of the existing communications infrastructure do survive the emergency, the existing communications infrastructure may not be able to handle the increased traffic load typical during emergencies. Specifically, remaining portions of the existing communication infrastructure may be overloaded as emergency personnel, and the general public, attempt various types of communications. Such deficiencies became clear during the events of Sep. 11, 2001, and again during the events of Hurricane Katrina.

Currently, base stations are deployed to the field in fixed infrastructure networks in which deployment time, and the time that is required to activate the base stations to provide service, is less critical than during emergency response situations. Disadvantageously, base station activation time (during which the base station cannot provide any service) is typically around ten to fifteen minutes, and possibly even longer. This base station activation time is unacceptably large during emergencies situations, where every minute is important. An alternative solution used during emergency situations is to keep the base stations activated and continuously transmitting, however, this requires a constant source of power, even when the base stations are not in use, and is, in general, wasteful of energy.

SUMMARY OF THE INVENTION

Various deficiencies in the prior art are addressed through the invention of a method and apparatus for controlling the operational state of a base station mounted on a vehicle based on the operational state of the vehicle. A method includes monitoring an operational state of the vehicle and switching the base station from a first operational state to a second operational state in response to the operational state of the vehicle switching from a first operational state to a second operational state.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION OF THE INVENTION

The present invention is described within the context of activating base stations in a rapidly deployable wireless network (denoted herein as a 911 network on wheels, i.e., 911-NOW); however, the present invention is applicable to activating base stations in various other networks. A 911-NOW network is formed by placing a 911-NOW node(s) on a mobile platform(s) such that when the mobile platform(s) is dispatched to a network site, the 911-NOW node(s) provides a wireless communication network. As described herein, one or more 911-NOW nodes may be deployed to form a wireless network. The 911-NOW network may be a standalone wireless network that is independent of existing network infrastructure or an integrated wireless network that utilizes existing network infrastructure.

Figure 1:
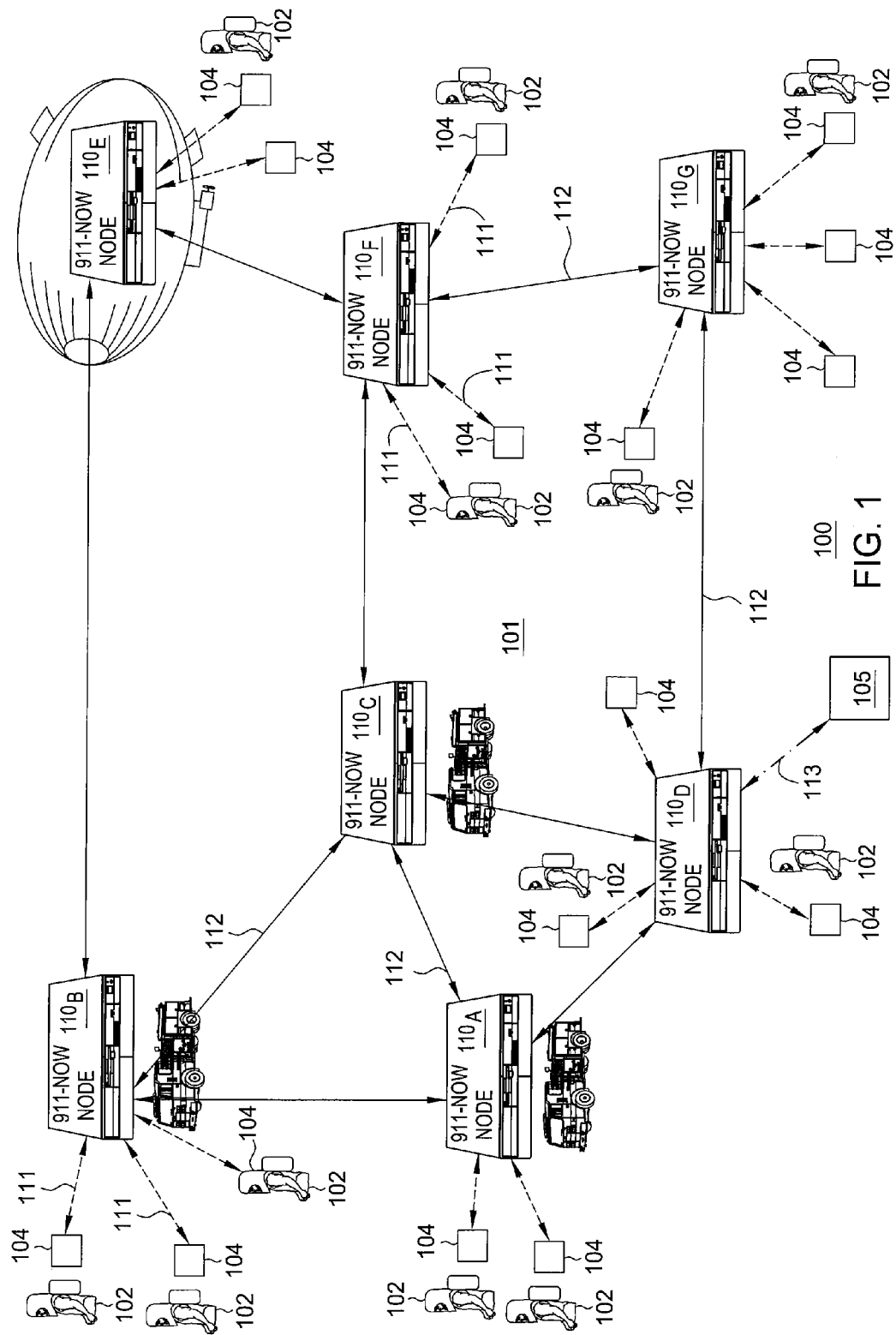
FIG. 1 depicts a standalone 911-NOW communication network architecture that is independent of any existing network infrastructure.

FIG. 1 depicts a standalone 911-NOW communication network architecture that is independent of any existing network infrastructure. Specifically, standalone 911-NOW communication network architecture 100 includes a plurality of 911-NOW nodes $110_A$-$110_G$ (collectively, 911-NOW nodes 110) supporting wireless communications at an emergency site 101. The standalone 911-NOW communication network architecture 100 provides a fully-functional network since each of the 911-NOW nodes 110 supports radio access network (RAN) functions, core networking functions, and services. As depicted in FIG. 1, each of the 911-NOW nodes 110 is placed or mounted on a mobile platform and transported to emergency site 101. The 911-NOW nodes 110 form a wireless network at emergency site 101.

The emergency site 101 may be any location or combination of locations at which a wireless network is required. The emergency site 101 may be a localized site, a collection of localized sites, a widespread site, a collection of widespread sites, and the like, as well as various combinations thereof. For example, emergency site 101 may be a single location, multiple locations within a town or city, or even span one or more counties, states, countries, or even continents. The 911-NOW network is not limited by the scope of the emergency site. The emergency site 101 may be associated with any type of emergency. For example, emergency site 101 may be associated with a natural disaster (e.g., a flood, a hurricane, a tornado, and the like), a manmade disaster (e.g., a chemical spill, a terrorist attack, and the like), and the like, as well as various combinations thereof.

As depicted in FIG. 1, emergency personnel (denoted herein as users 102 of the 911-NOW network 100) have responded to the emergency. The users 102 are performing various different functions at different areas of emergency site 101. For example, the users may be containing the disaster, participating in evacuation operations, participating in search and rescue operations, and the like, as well as various combinations thereof. The users 102 use equipment in responding to the emergency, including equipment capable of receiving and sending information wirelessly (denoted herein as wireless user devices 104 of users 102). The wireless user devices 104 include communication equipment, and may include various other types of emergency equipment (depending on the type of emergency, severity of the emergency, logistics of the emergency site, and various other factors).

For example, wireless user devices 104 may include wireless devices carried by emergency personnel for communicating with other emergency personnel, receiving information for use in responding at the emergency site, collecting information at the emergency site, monitoring conditions at the emergency site, and the like, as well as various combinations thereof. For example, wireless user devices 104 may include devices such as walkie-talkies, wireless headsets, cell phones, personal digital assistants (PDAs), laptops, and the like, as well as various combinations thereof. The wireless user devices 104 may include various other equipment, such as monitors (e.g., for monitoring breathing, pulse, and other characteristics; for monitoring temperature, precipitation, and other environmental characteristics; and the like), sensors (e.g., for detecting air-quality changes, presence of chemical or biological agents, radiation levels, and the like), and various other equipment.

As depicted in FIG. 1, a 911-NOW-based network is established at the emergency site 101 by deploying 911-NOW nodes 110 (illustratively, 911-NOW nodes $110_A$-$110_G$) to emergency site 101. The 911-NOW nodes 110 may be deployed using mobile platforms. The 911-NOW nodes 110 may be deployed using standalone mobile platforms. The 911-NOW nodes 110 may be deployed using mobile vehicles, including land-based vehicles, sea-based vehicles, and/or air-based vehicles. For example, 911-NOW nodes may be placed (and/or mounted) on police cars, swat trucks, fire engines, ambulances, humvees, boats, helicopters, blimps, airplanes, unmanned drones, satellites, and the like, as well as various combinations thereof. The 911-NOW nodes 110 may be deployed using various other mobile platforms.

As depicted in FIG. 1, 911-NOW node $110_A$ is deployed using a fire engine, 911-NOW node $110_B$ is deployed using a fire engine, 911-NOW node $110_C$ is deployed using a fire engine, 911-NOW node $110_D$ is deployed as a standalone node, 911-NOW node $110_E$ is deployed using a blimp, 911-NOW node $110_F$ is deployed as a standalone node, and 911-NOW node $110_G$ is deployed as a standalone node (although it should be noted that any of these 911-NOW nodes may be implemented on any of the vehicles described herein). The inherent mobility of the 911-NOW nodes 110 enables quick and flexible deployment of a wireless network as needed (e.g., when, where, and how the wireless network is needed), thereby providing scalable capacity and coverage on-demand as required by the emergency personnel. Since each 911-NOW node 110 supports RAN functions, core networking functions, and various services, deployment of even one 911-NOW node produces a fully-functional wireless network.

As depicted in FIG. 1, the 911-NOW nodes 110 support wireless communications for wireless user devices 104 (denoted herein as wireless access communications). The wireless access communications include wireless communications between a 911-NOW node 110 and wireless user devices served by that 911-NOW node 110. A 911-NOW node 110 includes one or more wireless access interfaces supporting wireless communications for wireless user devices 104 using respective wireless access connections 111 established between wireless user devices 104 and 911-NOW nodes 110. The 911-NOW nodes 110 further support mobility of user devices 104 at emergency site 101 such that, as users 102 move around emergency site 101, communication sessions between wireless user devices 104 of those users 102 and 911-NOW nodes 110 are seamlessly transferred between 911-NOW nodes 110.

As depicted in FIG. 1, the 911-NOW nodes 110 support wireless communications between 911-NOW nodes 110 (denoted herein as wireless mesh communications). The wireless mesh communications include wireless communications between 911-NOW nodes, including information transported between wireless user devices 104, control information exchanged between 911-NOW nodes 110, and the like, as well as various combinations thereof. A 911-NOW node 110 includes one or more wireless mesh interfaces supporting wireless communications with one or more other 911-NOW nodes 110. The wireless mesh communications between 911-NOW nodes 110 are supported using wireless mesh connections 112 established between 911-NOW nodes 110.

As depicted in FIG. 1, the following pairs of 911-NOW nodes 110 communicate using respective wireless mesh connections 112: 911-NOW nodes $110_A$ and $110_B$, 911-NOW nodes $110_A$ and $110_C$, 911-NOW nodes $110_A$ and $110_D$, 911-NOW nodes $110_B$ and $110_C$, 911-NOW nodes $110_C$ and $110_D$, 911-NOW nodes $110_B$ and $110_E$, 911-NOW nodes $110_C$ and $110_F$, 911-NOW nodes $110_D$ and $110_G$, 911-NOW nodes $110_E$ and $110_F$, and 911-NOW nodes $110_F$ and $110_G$. As such, 911-NOW nodes 110 of FIG. 1 communicate to form a wireless mesh network. Although a specific wireless mesh configuration is depicted and described with respect to FIG. 1, 911-NOW nodes 110 may communicate to form various other wireless mesh configurations, and mesh configurations may be modified in real-time as conditions change.

As depicted in FIG. 1, the 911-NOW nodes 110 support wireless communications for one or more management devices 105 (denoted herein as wireless management communications). The wireless management communications include wireless communications between a 911-NOW node 110 and a management device(s) 105 served by that 911-NOW node 110. A 911-NOW node 110 includes one or more wireless management interfaces supporting wireless communications for management device(s) 105. The wireless management communications between management device 105 and 911-NOW node $110_D$ are supported using a wireless management connection 113 established between management device 105 and 911-NOW node $110_D$.

The management device 105 is operable for configuring and controlling standalone 911-NOW network 100. For example, management device 105 may be used to configure and reconfigure one or more of the 911-NOW nodes 110, control access to the 911-NOW nodes, control functions and services supported by the 911-NOW nodes 110, upgrade 911-NOW nodes 110, perform element/network management functions for individual 911-NOW nodes or combinations of 911-NOW nodes (e.g., fault, performance, and like management functions) and the like, as well as various combinations thereof. The management device 105 may be implemented using existing devices (e.g., laptops, PDAs, and the like), or using a newly-designed device adapted to support such management functions.

The management device 105 may connect to one or more 911-NOW nodes 110 directly and/or indirectly using wireline and/or wireless interfaces. In one embodiment, for example, a 911-NOW node may include a wired management interface for access during non-emergency periods, e.g., while the emergency vehicle is back at the emergency station (e.g., while the fire truck is at the hire house). In this embodiment, the wireless management interface may be used for performing various activities, such as for routine maintenance, configuration, downloading collected performance data, and the like, as well as various combinations thereof.

The 911-NOW nodes 110 support wireless communications using one or more wireless technologies. For wireless access communications, each 911-NOW node 110 may support one or more different wireless technologies, such as Global System for Mobile Communications (GSM), General Packet Radio Service (GPRS), Evolution—Data Optimized (1xEV-DO), Universal Mobile Telecommunications System (UMTS), High-Speed Downlink Packet Access (HSDPA), Worldwide Interoperability for Microwave Access (WiMAX), and the like. For wireless mesh communications, each 911-NOW node 110 may support Wireless Fidelity (WiFi) or WiMAX technology, microwave technologies, or any other wireless technology. For wireless management communications, each 911-NOW node 110 may support one or more such cellular technologies, and, further, may support WiFi technology, Bluetooth technology, or any other wireless technology.

The wireless communications supported by 911-NOW nodes 110 convey user information, control information, and the like, as well as various combinations thereof. For example, user information may include voice communications (e.g., voice calls, audio conferences, push-to-speak, and the like), data communications (e.g., text-based communications, high-speed data downloads/uploads, file transfers, and the like), video communications (e.g., video broadcasts, conferencing, and the like), multimedia communications, and the like, as well as various combinations thereof. The communications supported by 911-NOW nodes 110 may convey various combinations of content, e.g., audio, text, image, video, multimedia, and the like, as well as various combinations thereof. For example, control information may include network configuration information, network control information, management information and the like, as well as various combinations thereof. Thus, 911-NOW nodes 110 support wireless communication of any information.

Although a specific number of 911-NOW nodes 110 is depicted and described as being deployed to form a 911-NOW network, fewer or more 911-NOW nodes may be deployed to form a 911-NOW network supporting communications required to provide an effective emergency response. Similarly, although a specific configuration of 911-NOW nodes 110 is depicted and described as being deployed to form a 911-NOW network, 911-NOW nodes may be deployed in various other configurations (including different locations at one emergency site or across multiple emergency sites, different combinations of mesh connections between 911-NOW nodes, and the like, as well as various combinations thereof) to form a standalone 911-NOW network supporting RAN functions, core networking functions, and various services supporting multimedia communications to provide an effective emergency response.

As described herein, although one or more 911-NOW nodes 110 are capable of forming a fully-functional standalone mesh wireless network without relying on existing infrastructure (fixed or variable), where there is existing infrastructure (that was not damaged or destroyed), the standalone 911-NOW wireless network may leverage the existing network infrastructure to form an integrated 911-NOW wireless network capable of supporting various additional capabilities (e.g., supporting communications with one or more other standalone 911-NOW wireless networks, supporting communications with one or more remote emergency management headquarters, supporting communications with other resources, and the like, as well as various combinations thereof). An integrated 911-NOW wireless network including a mesh 911-NOW network in communication with existing network infrastructure is depicted and described herein with respect to FIG. 2.

Figure 2:
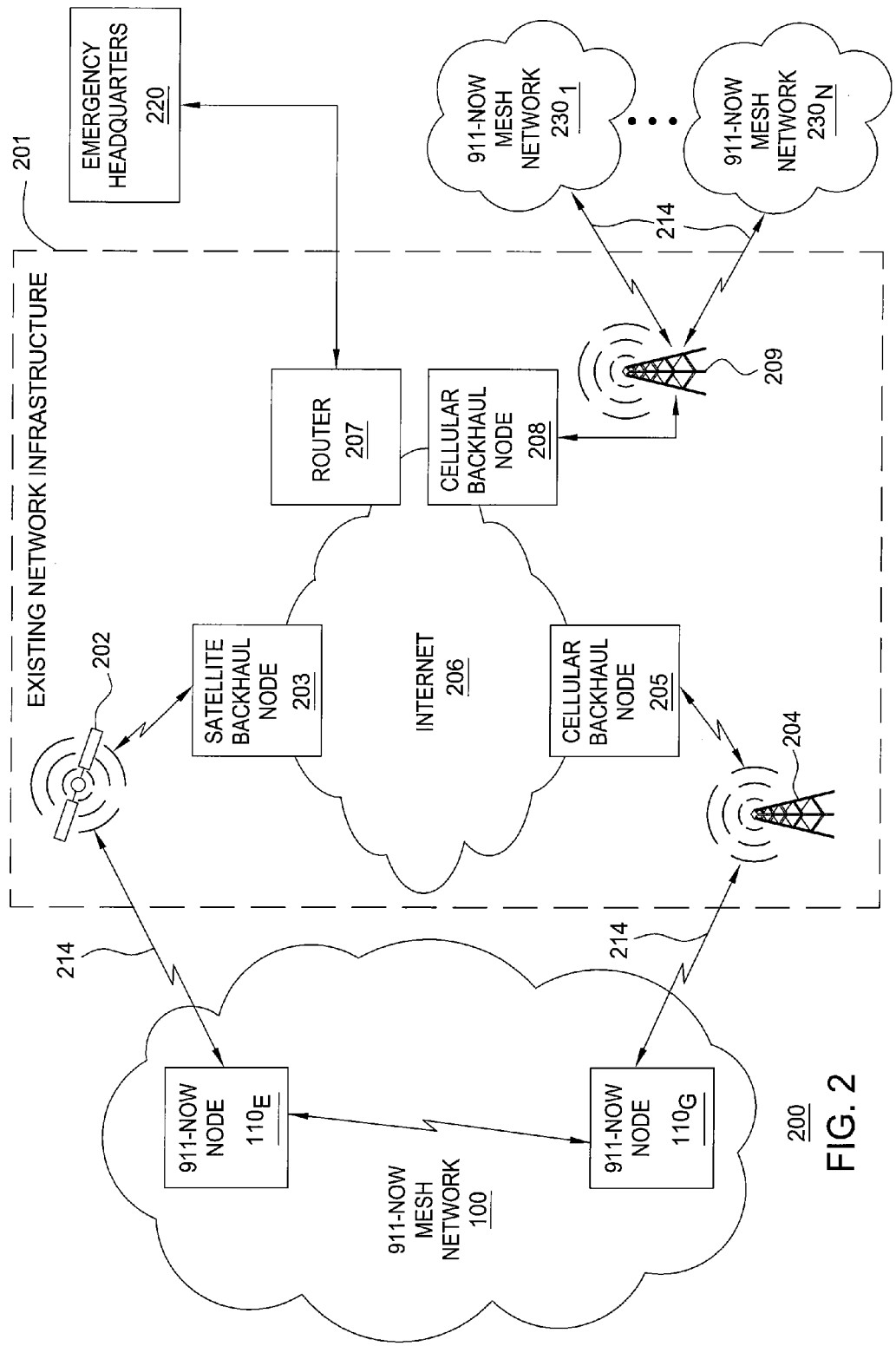
FIG. 2 depicts an integrated 911-NOW communication network architecture that utilizes a 911-NOW mesh network and an existing network infrastructure.

FIG. 2 depicts an integrated 911-NOW communication network architecture including a 911-NOW mesh network and an existing network infrastructure. Specifically, the integrated 911-NOW communication network architecture 200 includes 911-NOW mesh network 100 (depicted and described with respect to FIG. 1) and existing network infrastructure 201. The existing network infrastructure 201 may include any existing communications infrastructure adapted for supporting communications for 911-NOW mesh network 100 (e.g., including wireless communications capabilities, backhaul functions, networking functions, services, and the like, as well as various combinations thereof).

The existing network infrastructure 201 may include wireless access capabilities (e.g., radio access networks, satellite access networks, and the like, as well as various combinations thereof), backhaul capabilities (e.g., public and/or private, wireline and/or wireless, backhaul networks supporting mobility management functions, routing functions, and gateway functions, as well as various other related functions), core networking capabilities (e.g., AAA functions, DNS functions, DHCP functions, call/session control functions, and the like), services capabilities (e.g., application servers, media servers, and the like), and the like, as well as various combinations thereof. Since 911-NOW nodes 110 also supports such capabilities, in some embodiments at least a portion of these capabilities of existing network infrastructure 201 may only be relied upon when necessary.

As depicted in FIG. 2, the existing network infrastructure 201 supports wireless backhaul connections. Specifically, the existing network infrastructure 201 supports two wireless backhaul connections from 911-NOW mesh network 100. The existing network infrastructure 201 supports a first wireless backhaul connection 214 with 911-NOW node $110_E$ using a satellite 202, where satellite 202 is in wireless backhaul communication with a satellite backhaul node 203 at the edge of Internet 206. The existing network infrastructure 201 supports a second wireless backhaul connection 214 with 911-NOW node $110_G$ using a cellular base station 204, where cellular base station in 204 is in wireline backhaul communication with a cellular backhaul node 205 at the edge of Internet 206.

As depicted in FIG. 2, the existing network infrastructure 201 further supports other connections to other locations with which users 102 of emergency site 101 may communicate. The existing network infrastructure 201 includes a router 207 supporting communications for an emergency headquarters 220 (which may include, for example, emergency personnel and/or emergency systems). The existing network infrastructure 201 includes a cellular backhaul node 208 and an associated base station 209 supporting communications for one or more other 911-NOW mesh networks $230_1$-$230_N$ (i.e., one or more other standalone 911-NOW networks established at remote emergency sites).

The existing network infrastructure 201 supports communications for 911-NOW mesh network 100. The existing network infrastructure 201 may support communications between wireless user devices 104 of 911-NOW mesh network 100 (e.g., complementing wireless mesh communications between 911-NOW nodes 110 of the standalone 911-

NOW network 100). The existing network infrastructure 201 may support communications between wireless user devices 104 of 911-NOW mesh network 100 and other emergency personnel and/or emergency systems. For example, existing network infrastructure 201 may support communications between wireless user devices 104 of 911-NOW mesh network 100 and an emergency headquarters 220, one or more other 911-NOW mesh networks 230 (e.g., at emergency sites remote from emergency site 101), and the like, as well as various combinations thereof.

As depicted in FIG. 2, in addition to supporting one or more wireless access interfaces, one or more wireless mesh interfaces, and one or more wireless management interfaces, 911-NOW nodes 110 support one or more wireless backhaul interfaces supporting communications between 911-NOW nodes 110 and existing network infrastructure (illustratively, existing network infrastructure 201). The wireless backhaul communications between 911-NOW nodes 110 and existing network infrastructure 201 are supported using wireless backhaul connections 214 established between 911-NOW nodes 110 and existing network infrastructure 201. The wireless backhaul connections 214 may be provided using one or more wireless technologies, such as GSM, GPRS, EV-DO, UMTS, HSDPA, WiFi, WiMAX, microwave, satellite, and the like, as well as various combinations thereof.

The mesh networking capabilities provided by 911-NOW nodes 110, in combination with backhaul networking capabilities provided by 911-NOW nodes 110 using wireless backhaul connections with the existing network infrastructure 201, enable communications between emergency personnel at one emergency site (e.g., between users connected to 911-NOW nodes 110 of a standalone 911-NOW mesh network), between emergency personnel at different emergency sites (e.g., between users connected to 911-NOW nodes 110 of different standalone wireless mesh networks), between emergency personnel at one or more emergency sites and emergency management personnel (e.g., users stationed at emergency headquarters 220), and the like, as well as various combinations thereof.

Thus, 911-NOW nodes 110 may each support four different types of wireless interfaces. The 911-NOW nodes 110 support one or more wireless access interfaces by which user devices 104 may access 911-NOW nodes 110. The 911-NOW nodes 110 support one or more wireless mesh interfaces by which 911-NOW nodes 110 communicate with other 911-NOW nodes 110. The 911-NOW nodes 110 support one or more wireless backhaul interfaces by which the 911-NOW nodes 110 communicate with existing network infrastructure. The 911-NOW nodes 110 support one or more wireless management interfaces by which network administrators may manage the 911-NOW-based wireless network. The functions of a 911-NOW node 110 may be better understood with respect to FIG. 3.

Figure 3:
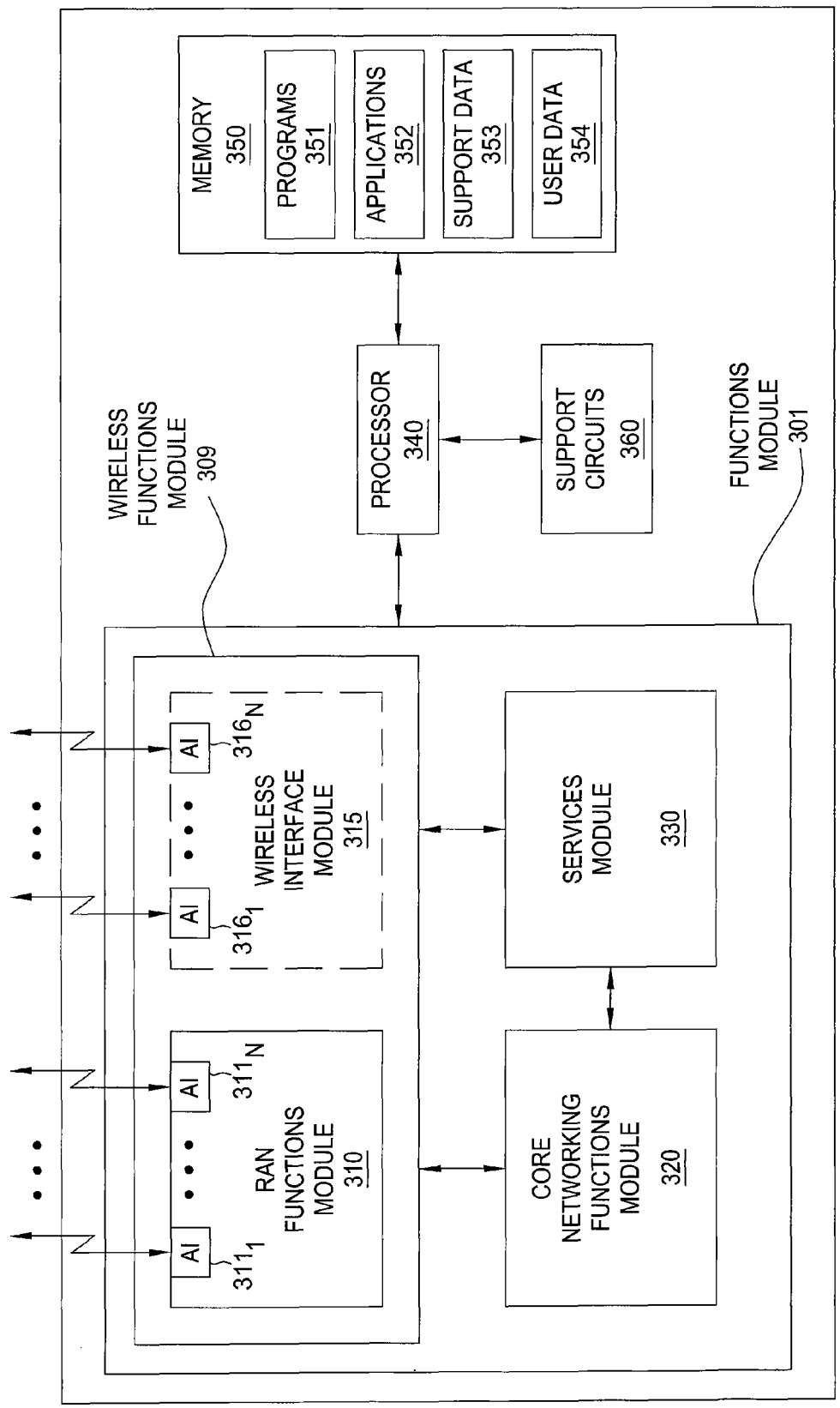
FIG. 3 depicts a high-level block diagram of one embodiment of a 911-NOW node.

FIG. 3 depicts a high-level block diagram of one embodiment of a 911-NOW node. Specifically, as depicted in FIG. 3, 911-NOW node 110 includes a functions module 301, a processor 340, a memory 350, and support circuit(s) 360 (as well as various other processors, modules, storage devices, support circuits, and the like required to support various functions of 911-NOW node 110). The functions module 301 cooperates with processor 340, memory 350, and support circuits 360 to provide various functions of 911-NOW node 110, as depicted and described herein).

The processor 340 controls the operation of 911-NOW node 110, including communications between functions module 301, memory 350, and support circuit(s) 360. The memory 350 includes programs 351, applications 352, support data 353 (e.g., user profiles, quality-of-service profiles, and the like, as well as various combinations thereof), and user data 354 (e.g., any information intended for communication to/from user devices associated with 911-NOW node 110). The memory 350 may store other types of information. The support circuit(s) 360 may include any circuits or modules adapted for supporting functions of 911-NOW node 110, such as power supplies, power amplifiers, transceivers, encoders, decoders, and the like, as well as various combinations thereof.

The functions module 301 includes a wireless functions module 309, a core (CORE) networking functions module 320, and a services module 330. The wireless functions module 309 includes a radio access network (RAN) functions module 310 and, optionally, a wireless interface module 315. The CORE networking functions module 320 provides CORE networking functions. The services module 330 provides one or more services. The RAN functions module 310 (and, when present, wireless interface module 315) communicate with both CORE networking functions module 320 and services module 330, and CORE networking functions module 320 and services module 330 communicate, to provide functions depicted and described herein.

The wireless functions module 309, CORE networking functions module 320, and services module 330 cooperate (in combination with processor 340, memory 350, and support circuits 360, and any other required modules, controllers, and the like, which are omitted for purposes of clarity) to provide a rapidly deployable wireless node which may form: (1) a single-node, standalone wireless network; (2) a multi-node, standalone wireless network (i.e., using wireless mesh connections between 911-NOW nodes); or (3) an integrated wireless network (i.e., using wireless backhaul connections between one or more 911-NOW nodes and existing network infrastructure and, optionally, using wireless mesh connections between 911-NOW nodes).

The RAN functions module 310 provides RAN functions. The RAN functions include supporting one or more wireless access interfaces for communications associated with wireless user devices. Specifically, RAN functions module 310 supports a plurality of air interfaces (AIs) $311_1$-$311_N$ (collectively, AIs 311). The AIs 311 provide wireless access interfaces supporting communications associated with wireless user devices. For example, AIs 311 may support functions typically provided by a base transceiver station (BTS).

The RAN functions module 310 provides control functions. The control functions may include any control functions typically performed by controllers in radio access networks. For example, the control functions may include functions such as admission control, power control, packet scheduling, load control, handover control, security functions, and the like, as well as various combinations thereof. For example, in one embodiment, the control functions may include functions typically performed by RAN network controllers (RNCs) or similar wireless network controllers.

The RAN functions module 310 provides network gateway functions. The network gateway functions may include any functions typically performed in order to bridge RAN and CORE networks, such as IP session management functions, mobility management functions, packet routing functions, and the like, as well as various combinations thereof. For example, where intended for use with CDMA2000-based wireless technology, the network gateway functions may include functions typically performed by a Packet Data Serving Node (PDSN). For example, where intended for use with GPRS-based and/or UMTS-based wireless technology, the network gateway functions may include functions typically performed by a combination of a GPRS Gateway Support Node (GGSN) and a Serving GPRS Support Node (SGSN).

In one embodiment, RAN functions module 310 may be implemented as a base station router (BSR). In one such embodiment, the BSR includes a base station (BS) or one or more modules providing BS functions, a radio network controller (RNC) or one or more modules providing RNC functions, and a network gateway (NG) or one or more modules providing NG functions. In such embodiments, RAN functions module 310 supports any functions typically supported by a base station router.

The wireless interface module 315 provides one or more wireless interfaces. The wireless interfaces provided by wireless interface module may include one or more of: (1) one or more wireless mesh interfaces supporting communications with other 911-NOW nodes; (2) one or more wireless backhaul interfaces supporting communications with existing network infrastructure; and/or (3) one or more wireless management interfaces supporting communications with one or more management devices. The wireless interface module 315 supports a plurality of air interfaces (AIs) $316_1$-$316_N$ (collectively, AIs 316), which provide wireless interfaces supporting communications associated with one or more of: one or more other 911-NOW nodes, existing network infrastructure, and one or more management devices.

In one embodiment, a 911-NOW node 110 is implemented without wireless interface module 315 (e.g., if the 911-NOW node 110 is not expected to require wireless mesh, backhaul, or management capabilities). In one embodiment, a 911-NOW node 110 includes a wireless interface module 315 supporting a subset of: one or more wireless mesh interfaces, one or more wireless backhaul interfaces, and one or more wireless management interfaces (i.e., the 911-NOW node is tailored depending on whether the 911-NOW node 110 will require wireless management, mesh, and/or backhaul capabilities). In one embodiment, a 911-NOW node 110 includes a wireless interface module 315 supporting each of: one or more wireless mesh interfaces, one or more wireless backhaul interfaces, and one or more wireless management interfaces (i.e., all types of wireless interfaces are available should the 911-NOW node 110 require such wireless capabilities).

The CORE networking functions module 320 provides networking functions typically available from the CORE network. For example, CORE networking functions module 320 may provide authentication, authorization, and accounting (AAA) functions, domain name system (DNS) functions, dynamic host configuration protocol (DHCP) functions, call/session control functions, and the like, as well as various combinations thereof. One skilled in the art knows which functions are typically available from the CORE network.

The services module 330 provides services. The services may include any services capable of being provided to wireless user devices. In one embodiment, for example, services module 330 may provide services typically provided by application servers, media servers, and the like, as well as various combinations thereof. For example, services may include one or more of voice services, voice conferencing services, data transfer services (e.g., high-speed data downloads/uploads, file transfers, sensor data transfers, and the like), video services, video conferencing services, multimedia services, multimedia conferencing services, push-to-speak services, instant messaging services, and the like, as well as various combinations thereof. One skilled in the art knows which services are typically available over RAN and CORE networks.

Although primarily depicted and described herein with respect to a specific configuration of a 911-NOW node including three modules providing wireless functions (including RAN functions and, optionally, additional wireless interfaces and associated interface functions), CORE networking functions, and services, respectively, 911-NOW nodes may be implemented using other configurations for providing wireless functions, CORE networking functions, and services. Similarly, although primarily depicted and described herein with respect to a specific configuration of a functions module providing specific wireless functions, CORE networking functions, and services, functions modules of 911-NOW nodes may be implemented using other configurations for providing wireless functions, CORE networking functions, and services.

Therefore, it is contemplated that at least a portion of the described functions may be distributed across the various functional modules in a different manner, may be provided using fewer functional modules, or may be provided using more functional modules. Furthermore, although primarily depicted and described with respect to specific wireless functions (including RAN functions and, optionally, one or more additional wireless interface functions), CORE networking functions, and services, it is contemplated that fewer or more wireless functions (including RAN functions, optionally, and one or more additional wireless interface functions), CORE networking functions, and/or services may be supported by a 911-NOW node. Thus, 911-NOW nodes are not intended to be limited by the example functional architectures depicted and described herein with respect to FIG. 3.

In emergency situations, emergency vehicles will typically be expected to be able to support emergency response functions almost immediately upon arriving at an emergency site. As described herein, communication between emergency responders is important and, thus, emergency vehicles equipped with a rapidly deployable base station (e.g., a 911-NOW node as depicted and described herein) will be expected to provide communications in support of the emergency response almost immediately upon arriving at the emergency site. The present invention provides an automated, multi-phase base station deployment process that enables the base station of the emergency vehicle to support communications almost immediately upon arriving at the emergency site with minimal activity by the emergency responders.

The automated, multi-phase base station deployment process is automated by controlling the base station deployment process using the operational state of the emergency vehicle on which the base station is mounted, thereby preventing emergency responders from having to use critical time to perform the base station deployment process manually. Furthermore, by performing the base station deployment process in a multi-phase manner, a portion of the base station deployment process may be performed while the emergency vehicle is en route to the emergency site, thereby enabling the base station to support communications almost immediately upon arriving at the emergency site. The automated, multi-phase base station deployment process of the present invention may be better understood with respect to FIG. 4-FIG. 8.

Figure 4:
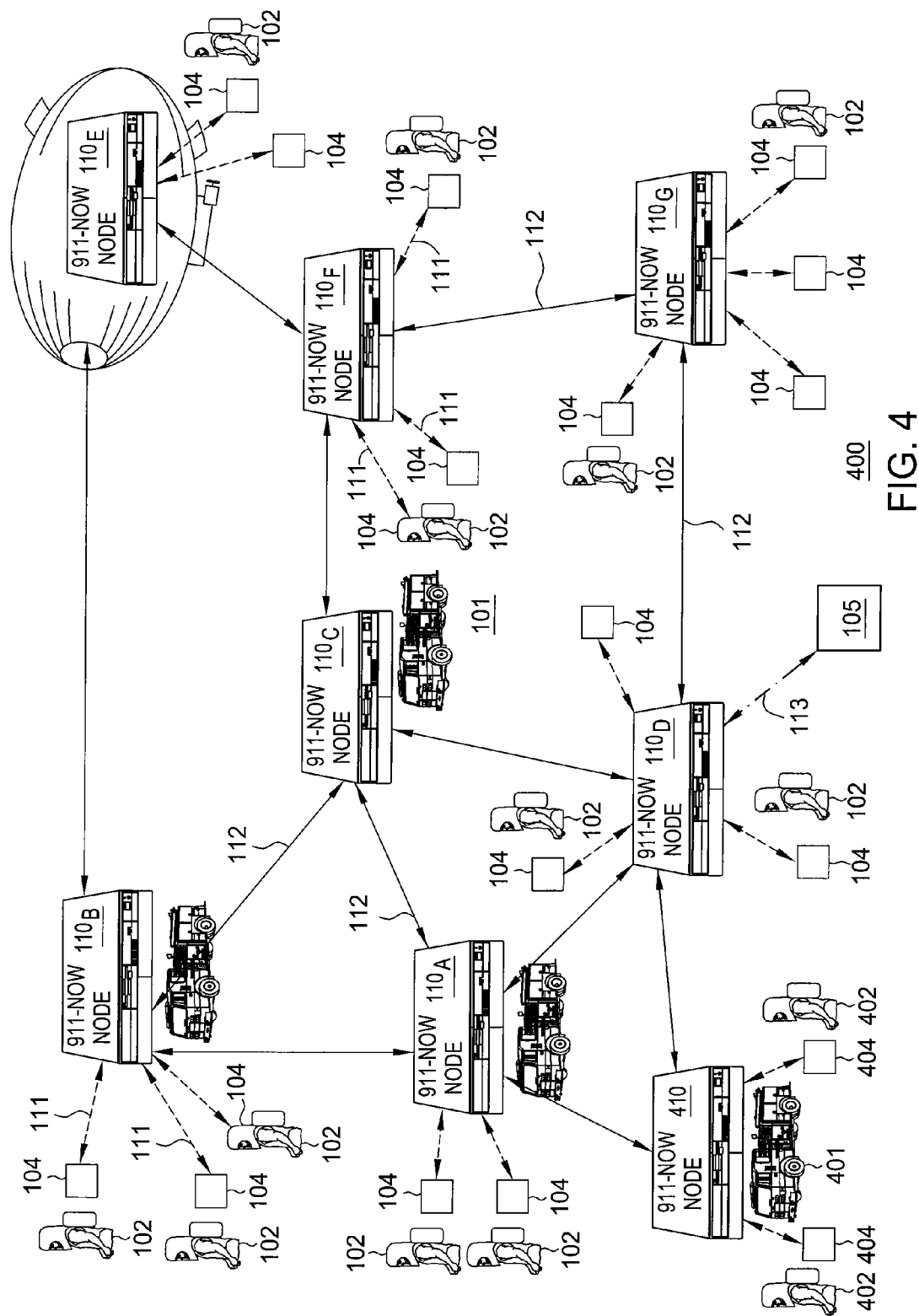
FIG. 4 depicts the 911-NOW communication network architecture of FIG. 1 in which a visiting 911-NOW node arrives at the emergency site.

FIG. 4 depicts the 911-NOW communication network architecture of FIG. 1 in which an additional 911-NOW node arrives at the emergency site. Although primarily depicted and described within the context of a standalone wireless network (illustratively, standalone wireless network of FIG. 1), the present invention may also be used in an integrated wireless network (e.g., such as the integrated wireless network of FIG. 2). As depicted in FIG. 4, an emergency vehicle 401 (depicted as a fire truck) arrives at emergency site 101. The emergency vehicle 401 includes additional 911-NOW node 410 which, upon arriving at emergency site 101, may be immediately required to support communications at emergency site 101, including communications by emergency personnel 402 transported to emergency site 101 by emergency vehicle 401, as well as communications by other users 102 already at emergency site 101.

In order for 911-NOW node 410 to support communications at emergency site 101, the base station portion of 911-NOW node 410 must be activated. The activation of a base station typically requires time for an initial boot-up of the base station, time for at least one power amplifier to warm up, and time for configuration of base station parameters (which may optionally include performing GPS synchronization). As described herein, in order to ensure that at least the base station of 911-NOW node 410 is available to support communications immediately upon arriving at emergency site 101, an automated, multi-phase base station deployment process is implemented by controlling the deployment of the base station using the operational state of the vehicle on which the base station is mounted.

An emergency response vehicle can be in different modes of operation. The different modes of operation correspond to different phases of a typical deployment scenario for emergency response vehicles (e.g., off-duty, at the emergency station and ready for deployment, driving to the scene of the emergency, active, standby for backup support, returning to the station after the emergency response mission is complete, and the like).

These different modes of operation correlate with different modes of operation for an emergency response communication system of the emergency response vehicle (including expectations of what functions such a communication system should perform, how the communication system show perform those functions, and like expectations, as well as various combinations thereof).

The different modes of operation of the emergency response vehicle depend on the respective states of different systems of the emergency response vehicle (e.g., depending on the states of the ignition system, the shift control system (e.g., which controls transmission, power take-off, and other systems), and other systems, which may vary for different emergency response vehicles).

When the emergency response vehicle is parked at the emergency station, the emergency response vehicle may be in an inactive state in which the ignition is turned OFF and other systems of the emergency response vehicle are disengaged or disabled. For example, when the emergency response vehicle is parked at the emergency station, the transmission is disengaged, the power take-off is disengaged, and other systems may or may not be disengaged or disabled).

When an emergency call is received, the emergency response vehicle is dispatched from the emergency station to an emergency site associated with the emergency call. The emergency personnel start the emergency response vehicle (e.g., start the ignition such that the state of the ignition switches from OFF to ON), engage the transmission (such that the state of the transmission switches from DISENGAGED to ENGAGED) of the emergency response vehicle, and directs the emergency response vehicle to the emergency site (e.g., drive a fire truck to the emergency site, drive an ambulance to the emergency site, fly a helicopter to the emergency site, and the like).

Upon arriving at the emergency site, the emergency personnel switch the shift control of the emergency response vehicle from the transmission to the power take-off. The shift control controls the destination of the engine drive output of the emergency response vehicle. The engine drive output may be directed to select the transmission of the emergency response vehicle (i.e., to move the wheels of the emergency response vehicle) or may be directed to select the power take-off of the emergency response vehicle (i.e., to move some other component(s) of the emergency response vehicle).

In other words, using a shift control system of the emergency response vehicle, the transmission of the emergency response vehicle is disengaged (i.e., the operational state of the transmission switches from ENGAGED to DISENGAGED) and the power take-off of the emergency response vehicle is engaged (i.e., the operational state of the power take-off switches from DISENGAGED to ENGAGED). The power take-off switches the power source of the emergency response vehicle (i.e., the engine) from powering the drivetrain of the emergency response vehicle to powering other systems of the emergency response vehicle.

Thus, using a shift control system of the emergency response vehicle, the engine drive output may be switched from selecting the transmission of the emergency response vehicle (i.e., when the transmission is ENGAGED and the power take-off is DISENGAGED) to selecting the power take-off of the emergency response vehicle (i.e., when the power take-off is ENGAGED and transmission is DISENGAGED). In other words, the transmission and/or the power take-off may be used to determine whether or not the emergency response vehicle is parked (which may be used to control the operational state of the base station).

Upon engaging the power take-off, the emergency response vehicle may then be used to provide any emergency response functions required at the emergency site. For example, the vehicle battery system may be used to power systems on the vehicle which may be used to provide emergency response functions, the power take-off may be used to move components on the vehicle which may be used to provide emergency response functions, and the like, as well as various combinations thereof.

For example, on a fire truck the batteries may be used to power the lighting system, and the power take-off may be used to perform functions such as moving the water pumps for the fire hoses, operating the ladder on the fire truck, and the like. For example, on an ambulance, the power take-off may be used to operate medical equipment. For example, on a hazmat vehicle, the power take-off may be used to operate a chemical analysis lab or a decontamination unit. On other rescue vehicles, the power take-off may be used to perform other functions (e.g., run an electric motor or generator, run a hydraulic pump, and the like, as well as various combinations thereof).

When the emergency response vehicle is preparing to leave the emergency site (e.g., to proceed to another emergency site, to transport one or more victims to another location, to return to the emergency station, and the like), the power take-off of the emergency response vehicle is disengaged (i.e., the operational state of the power take-off switches from ENGAGED to DISENGAGED), the transmission of the emergency response vehicle is engaged (i.e., the operational state of the transmission switches from DISENGAGED to ENGAGED), and the emergency response vehicle is directed to the intended destination.

In addition to traditional functions provided by the emergency response vehicle, for an emergency response vehicle having a 911-NOW node (or some other communication device, such as a standard base station) mounted thereon, the 911-NOW node may be used to provide communications at the emergency site, as depicted and described herein. The present invention, by monitoring the respective operational states of such systems of emergency response vehicles, may automatically control the operational state of the 911-NOW node mounted thereon.

As described herein, since this typical operation of the emergency response vehicle automatically results in the described operational state transitions of the respective systems of the emergency response vehicle (e.g., the ignition system, the shift control system including the transmission system and the power take-off system, and like systems of the emergency response vehicle), the present invention advantageously uses these operational state transitions of the systems of the emergency response vehicle to control the operational state transitions of a base station mounted on the emergency response vehicle, thereby enabling automatic deployment of the base station (including automatic activation of the base station) and, thus, relieving the emergency personnel from the burden of controlling another system while concentrating on the emergency event.

A base station (or other similar communication device, such as a 911-NOW node) may support various operational states. The operational state of a base station is indicative of the present ability of the base station to provide service (i.e., to support communications at the emergency site to which the emergency response vehicle has been deployed). In one embodiment, for example, operational states supported by a base station include an INACTIVE state, a STANDBY state, and at least one ACTIVE state (e.g., a LOCAL OPERATIONS state and a NORMAL OPERATIONS state), although a base station may support fewer or more, as well as different, operational states.

In one embodiment, when the base station is in the INACTIVE state, the base station is powered down.

In one embodiment, when the base station transitions from the INACTIVE state to the STANDBY state, the base station is powered on, base station electronics (e.g., power amplifiers, power boosters, and the like) are warmed to operational readiness, base station software is booted, base station calibrations are performed, and like base station start-up activities are performed. While in the STANDBY state, RF transmissions and call processing functions of the base station are disabled (e.g., to prevent undesired un-calibrated RF interference with other base stations at the emergency site).

In one embodiment, when the base station transitions from the STANDBY state to an ACTIVE state, RF transmission and call processing functions of the base station are switched from disabled to enabled. The determination as to whether the base station transitions to the LOCAL OPERATIONS state or the NORMAL OPERATIONS state depends on whether Global Positioning System (GPS) synchronization has been achieved by the base station (and, optionally, on whether or not a manual enable override has been engaged or disengaged by an emergency responder of the emergency response vehicle).

If GPS synchronization has not been achieved, the base station transitions from the STANDBY state to the LOCAL OPERATIONS state. If the base station is in the LOCAL OPERATIONS state and GPS synchronization is achieved by the base station, the base station may automatically transition from the LOCAL OPERATIONS state to the NORMAL OPERATIONS state. If GPS synchronization has been achieved, the base station transitions from the STANDBY state to the NORMAL OPERATIONS state (or, alternatively, to the LOCAL OPERATIONS state where a manual override is used to force the base station into the NORMAL OPERATIONS state).

In one embodiment, in order to deactivate the base station, the base station may follow the reverse progression of operational states.

In one embodiment, from the ACTIVE state (e.g., either the LOCAL OPERATIONS state or the NORMAL OPERATIONS state), the base station may transition back to the STANDBY state. When the base station transitions from the ACTIVE state to the STANDBY state, RF transmissions and call processing functions of the base station are switched from enabled to disabled.

In one embodiment, from the STANDBY state, the base station may transition back to the INACTIVE state. When the base station transitions from the STANDBY state to the INACTIVE state, the base station performs a shutdown sequence and the base station is powered down (e.g., a controller signals the power control circuitry to remove power and enter the un-powered inactive state).

The base station shutdown sequence may include any actions that may be performed when a base station is shut down, such as saving operating parameters of the base station, saving data, shutting down base station software, and the like, as well as various combinations thereof.

In one embodiment, the base station may transition directly from the ACTIVE state to the INACTIVE state, while still performing any actions required for a smooth shutdown (e.g., such as saving operational parameters of the base station, saving data, shutting down base station software, and the like, as well as various combinations thereof).

The present invention monitors the operational state of the emergency response vehicle and controls the operational state of a base station mounted on the emergency response vehicle based on the operational state of the emergency response vehicle. The operational state of the emergency response vehicle may be determined based on the respective states of one or more of the systems of the emergency response vehicle, which may include existing systems of the emergency response vehicle (e.g., the ignition system, the shift control system including the transmission system and the power take-off system, and the like, as well as various combinations thereof) and one or more additional systems or controls added to the emergency response vehicle for the purpose of controlling the operational states of a base station mounted on the emergency response vehicle.

In one embodiment, for example, an antenna mast system may be added to the emergency response vehicle. The antenna mast system may be added to the emergency response vehicle for purposes of raising one or more transmission antennas to a height required for supporting communications by the base station. In one such embodiment, an operational state of the antenna mast system may be monitored for use in controlling the operational state of the base station mounted on the emergency response vehicle. For example, a threshold height may be specified such that the antenna mast system is deemed to be in a first operational state (e.g., UNDEPLOYED) when the actual height of the antenna mast is below the threshold height and deemed to be in a second operational (e.g., DEPLOYED) when the actual height of the antenna mast is above the threshold height.

In one embodiment, one or more communications control systems may be added to an emergency response vehicle for use in manually controlling the base station activation process. In one such embodiment, an operational state of the communications control system(s) may be monitored for use in controlling the operational state of the base station that is mounted on the emergency response vehicle. An example of one such communications control system is depicted and described herein (referred to herein as a base station enable control system). The base station enable control system may be better understood with respect to FIG. 5.

In one such embodiment, although primarily depicted and described herein with respect to an automated base station deployment process, an emergency response vehicle may include one or more manual controls by which an emergency responder may override the automated base station deployment process (i.e., using a base station enable control). The manual control(s) may be implemented using any control means (e.g., electronic, mechanical, and the like, as well as various combinations thereof). The manual control means may be coupled to the emergency vehicle in any manner.

In one embodiment, for example, manual control may be implemented using a computer interface (e.g., using a computer interface having a display and one or more user interfaces, such as a keyboard, a mouse, and the like). In this embodiment, for example, the computer interface may be mounted on the emergency vehicle (e.g., in the cab of the emergency response vehicle or in any other portion of the vehicle), may be a remotely controlled computer interface adapted for wired and/or wireless communication with the vehicle and/or the base station, and the like, as well as various combinations thereof.

In one embodiment, for example, manual control may be implemented using one or more electromechanical control means (e.g., such as one or more buttons, switches, and the like, as well as various combinations thereof, which, when actuated, provide a control signal(s)). In this embodiment, for example, the electromechanical control means may be mounted anywhere on the emergency response vehicle (e.g., inside the cab, in one or more control panels on the emergency response vehicle, and the like, as well as various combinations thereof).

Although primarily depicted and described herein with respect to specific systems of the emergency response vehicle (e.g., existing systems, newly added systems, and the like, as well as various combinations thereof), emergency response vehicles may support fewer or more, as well as different, systems. Although primarily depicted and described herein with respect to specific operational states of each of the systems of an emergency response vehicle, different systems of different emergency response vehicles may support fewer or more, as well as different, operational states. Although primarily depicted and described herein with respect to specific operational states of a base station, base stations may support fewer or more, as well as different, operational states.

As such, correspondence (also referred to herein as mapping) between the operational states of systems of an emergency response vehicle and the operational states of a base station mounted on the emergency response vehicle may be implemented using numerous different combinations. A correspondence between operational states of systems of an emergency response vehicle and operational states of a base station mounted on the emergency response vehicle according to one embodiment of the present invention is depicted and described with respect to FIG. 5.

Figure 5A:
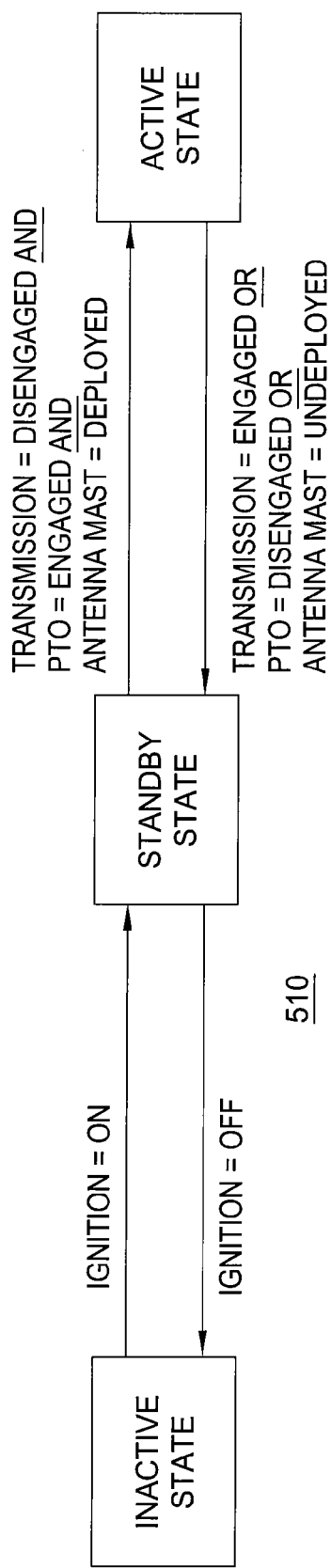
FIG. 5 depicts a method according to one embodiment of the present invention.

FIG. 5A depicts a state transition diagram according to an embodiment of the present invention in which manual control of the operational state of the base station is not supported. Specifically, FIG. 5A depicts a state transition diagram 510 including states corresponding to operational states supported by a base station and state transitions controlled by monitoring the operational state of an emergency response vehicle on which the base station is mounted (i.e., by monitoring operational states supported by systems of the emergency response vehicle on which the base station is mounted).

As depicted in FIG. 5A, the base station supports three states: an INACTIVE state, a STANDBY state, and an ACTIVE state.

When the base station is in the INACTIVE state, in response to the ignition system of the emergency response vehicle switching from OFF to ON (e.g., when an emergency responder turns on the engine of the emergency response vehicle prior to leaving the emergency station for the emergency site), the base station transitions from the INACTIVE state to the STANDBY state.

When the base station is in the STANDBY state, in response to the transmission of the emergency response vehicle being DISENGAGED, and the power take-off of the emergency response vehicle being ENGAGED, and the antenna mast of the emergency response vehicle being DEPLOYED, the base station is transitions from the STANDBY state to the ACTIVE state. As depicted in FIG. 5, in this embodiment the base station is not transitioned to the ACTIVE state until all three of the specified conditions have been satisfied (however, as described herein, in other embodiments the base station may be transitioned from the STANDBY state to the ACTIVE state in response to fewer or more conditions being satisfied).

When the base station is in the ACTIVE state, in response to the antenna mast of the emergency response vehicle being UNDEPLOYED, or the power take-off of the emergency response vehicle being DISENGAGED, or the transmission of the emergency response vehicle being ENGAGED, the base station is transitioned from the ACTIVE state to the STANDBY state. As depicted in FIG. 5, in this embodiment, the base station is not transitioned to the STANDBY state until all three of the specified conditions are satisfied (however, as described herein, in other embodiments the base station may be transitioned from the ACTIVE state to the STANDBY state in response to fewer or more conditions being satisfied).

When the base station is in the STANDBY state, in response to the ignition of the emergency response vehicle being switched from ON to OFF (e.g., when an emergency responder turns off the engine of the emergency response vehicle upon arriving back at the emergency station from the emergency site), the base station transitions from the STANDBY state to the INACTIVE state.

Figure 5B:
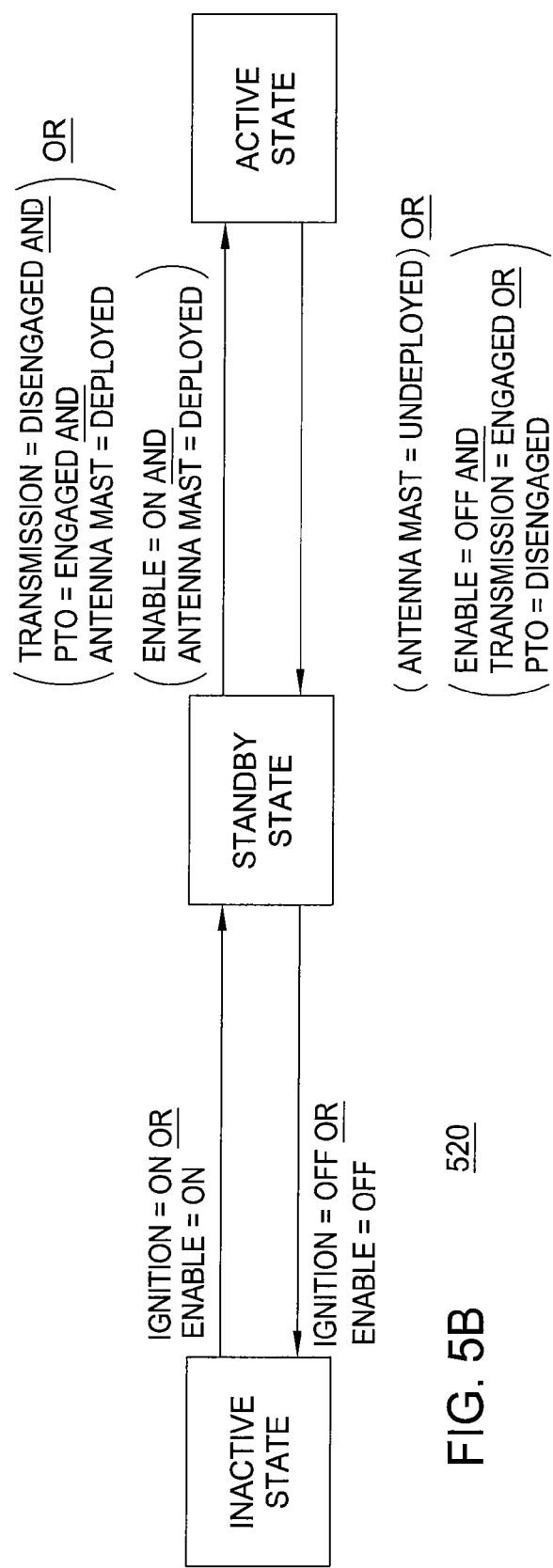

FIG. 5B depicts a state transition diagram according to an embodiment of the present invention in which manual control of the operational state of the base station is supported. Specifically, FIG. 5B depicts a state transition diagram 520 including states corresponding to operational states supported by a base station and state transitions controlled by monitoring the operational state of an emergency response vehicle on which the base station is mounted (i.e., by monitoring operational states supported by systems of the emergency response vehicle on which the base station is mounted).

The state transition diagram 520 functions in a manner similar to the state transition diagram 510 of FIG. 5A, with some exceptions related to the addition (to the emergency response vehicle) of a base station enable control system. As depicted in FIG. 5B, the base station enable control system of the emergency response vehicle may controls transitions between the INACTIVE state of the base station and the STANDBY state of the base station, as well as between the STANDBY state of the base station and the ACTIVE state of the base station.

When the base station is in the INACTIVE state, in response to the ignition system of the emergency response vehicle being switched from OFF to ON, or in response to the base station enable control switch of the emergency response vehicle being switched from DISABLED to ENABLED, the base station is transitioned from the INACTIVE state to the STANDBY state.

When the base station is in the STANDBY state, the base station may be transitioned from the STANDBY state to the ACTIVE state in a manner similar to the corresponding transition depicted and described with respect to FIG. 5A.

Alternatively, when the base station is in the STANDBY state, the base station may be transitioned from the STANDBY state to the ACTIVE state using the manual enable switch (e.g., in response to the base station enable control switch of the emergency response vehicle being ENABLED and the antenna mast of the emergency response vehicle being DEPLOYED).

When the base station is in the ACTIVE state, in response to the antenna mast of the emergency response vehicle being UN DEPLOYED, the base station is transitioned from the ACTIVE state to the STANDBY state.

Alternatively, when the base station is in the ACTIVE state, the base station may be transitioned from the ACTIVE state to the STANDBY state using the manual enable switch (e.g., in response to the base station enable control switch of the emergency response vehicle being DISABLED and either the transmission of the emergency response vehicle being ENGAGED or the power take-off of the emergency response vehicle being DISENGAGED, the base station is transitioned from the ACTIVE state to the STANDBY state).

When the base station is in the STANDBY state, in response to the ignition system of the emergency response vehicle being OFF and the base station enable control switch of the emergency response vehicle being DISABLED, the base station is transitioned from the STANDBY state to the INACTIVE state.

In other words, in this embodiment the base station enable control system of the emergency response vehicle enables the base station to be maintained in the STANDBY state even when the emergency response vehicle is turned off. Thus, since many emergency response vehicles remain connected to power sources at the emergency station, a base station that is mounted on an emergency response vehicle may remain in the STANDBY state even when the emergency response vehicle is parked at the emergency station with the ignition turned OFF.

This embodiment advantageously decreases the deployment time required to deploy the base station such that the base station is operable for supporting communications at an emergency site (i.e., because the base station has already completed the transition from the INACTIVE state to the STANDBY state). This embodiment is advantageous when the time required for the base station to transition from the INACTIVE state to the STANDBY state is expected to be longer than the time required for base station to transition from the STANDBY state to the ACTIVE state. This embodiment is also advantageous when the time required for the base station to transition from the INACTIVE state to the STANDBY state is shorter than the typical time required for the emergency response vehicle to reach the emergency site.

Although primarily depicted and described with respect to specific mappings between specific operational states of an emergency response vehicle and specific operational states of a base station, the present invention may be implemented using different combinations of mappings between operational states of the emergency response vehicle and operational states of the base station. For example, the different operational states supported by an emergency response vehicle may vary for different types of emergency response vehicles (e.g., fewer, more, and/or different operational states may be supported, and the different operational states supported by a base station vary for different types of base stations).

Similarly, although primarily depicted and described with respect to specific mappings between specific operational state transitions (and triggers of those operational state transitions) of an emergency response vehicle and specific operational state transitions (and triggers of those operational state transitions) of a base station, the present invention may be implemented using different combinations of mappings between operational state transitions (and triggers of those operational state transitions). For example, the different operational state transitions supported by an emergency response vehicle may vary for different types of emergency response vehicles (e.g., fewer, more, and/or different operational state transitions may be supported). For example, the different operational state transitions supported by a base station vary for different types of base stations (e.g., fewer, more, and/or different operational state transitions may be supported).

Figure 6:
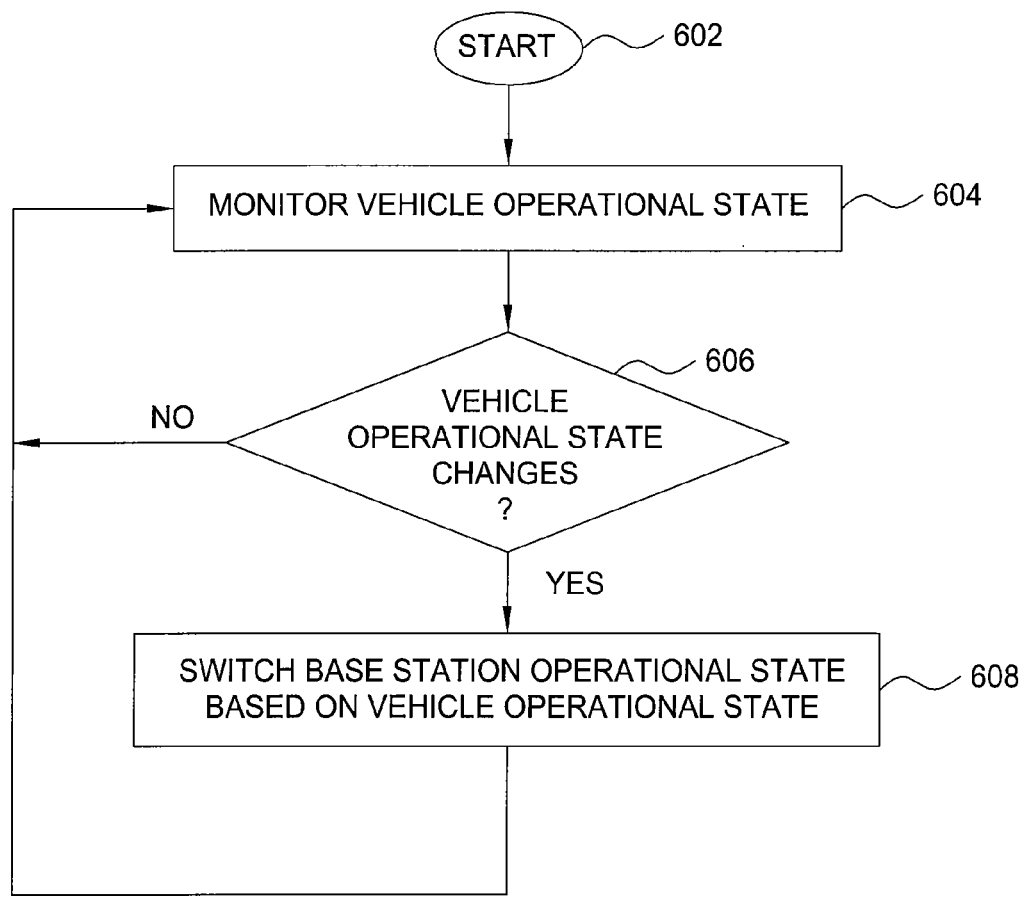
FIG. 6 depicts a state transition diagram according to one embodiment of the present invention.

Thus, since the present invention may be implemented for any type of communications device mounted on any type of vehicle supporting any operational states, a method according to one embodiment of the present invention may be generalized as depicted and described with respect to FIG. 6.

FIG. 6 depicts a method according to one embodiment of the present invention. Specifically, method 600 of FIG. 6 includes a method for controlling an operational state of a base station mounted on a vehicle based on the operational state of the vehicle. Although depicted and described as being performed serially, at least a portion of the steps of method 600 of FIG. 6 may be performed contemporaneously, or in a different order than depicted and described with respect to FIG. 6. The method 600 begins at step 602 and proceeds to step 604.

At step 604, the operational state of the vehicle is monitored. The operational state of the vehicle may be monitored by monitoring one or more systems of the vehicle. For example, the operational state of the vehicle may be monitored by monitoring one or more of the ignition system, the shift control system which includes the transmission system and the power take-off system, the antenna mast system, and other systems, and the like, as well as various combinations thereof. The operational state of the vehicle may be monitored in any manner for monitoring the operational state(s) of one or more systems of the vehicle.

At step 606, a determination is made as to whether the operational state of the vehicle has changed. The operational state of the vehicle may change based on a change of the operational state(s) of one or more systems of the vehicle. If the operational state of the vehicle has not changed, method 600 returns to step 604 (i.e., the operational state of the vehicle continues to be monitored for a change which may trigger a corresponding transition of the operational state of the base station). If the operational state of the vehicle has changed, method 600 proceeds to step 608.

At step 608, the operational state of the base station is switched based on the operational state of the vehicle. The operational state of a base station may be switched (transitioned) in any manner.

For example, switching the operational state of the base station from the INACTIVE state to the STANDBY state may include powering up the base station using a power source and initiating and performing a base station activation process in which base station electronics are warmed to operational readiness, base station software is booted, base station calibrations are performed, and like base station start-up activities are performed.

For example, switching the operational state of the base station from the STANDBY state to the INACTIVE state may include performing a base station deactivation process (e.g., gracefully shutting down base station software and like base station shut down activities) and powering down the base station.

From step 608, method 600 returns to step 604, where the operational state of the vehicle continues to be monitored for a change which may trigger a transition of the operational state of the base station).

As described with respect to FIG. 6, the operational state of the vehicle may be monitored in any manner for monitoring the operational state(s) of one or more systems of the vehicle. In one embodiment, for example, the vehicle may be equipped with one or more base station control systems. The base station control system(s) may be adapted for monitoring the operational state of the vehicle, controlling the operational state of base station, and performing like control functions.

In one embodiment, the base station control system(s) is implemented as a separate control system on the vehicle (e.g., not implemented as part of the base station). In this embodiment, the base station control system(s) may be a separate control system adapted to receive and process control signals from one or more vehicle systems in a manner for determining the operational state of the vehicle, and using the determined operational state of the vehicle to provide one or more control signals to the base station that the base station may use to control the operational state of the base station.

In one embodiment, the base station control system(s) is implemented as part of the base station. In this embodiment, the base station may be adapted to receive and process control signals from one or more vehicle systems in a manner for determining the operational state of the vehicle, and using the operational state of the vehicle to control the operational state of the base station. A vehicle equipped a base station control system according to one such embodiment of the invention is depicted and described with respect to FIG. 7.

Figure 7:
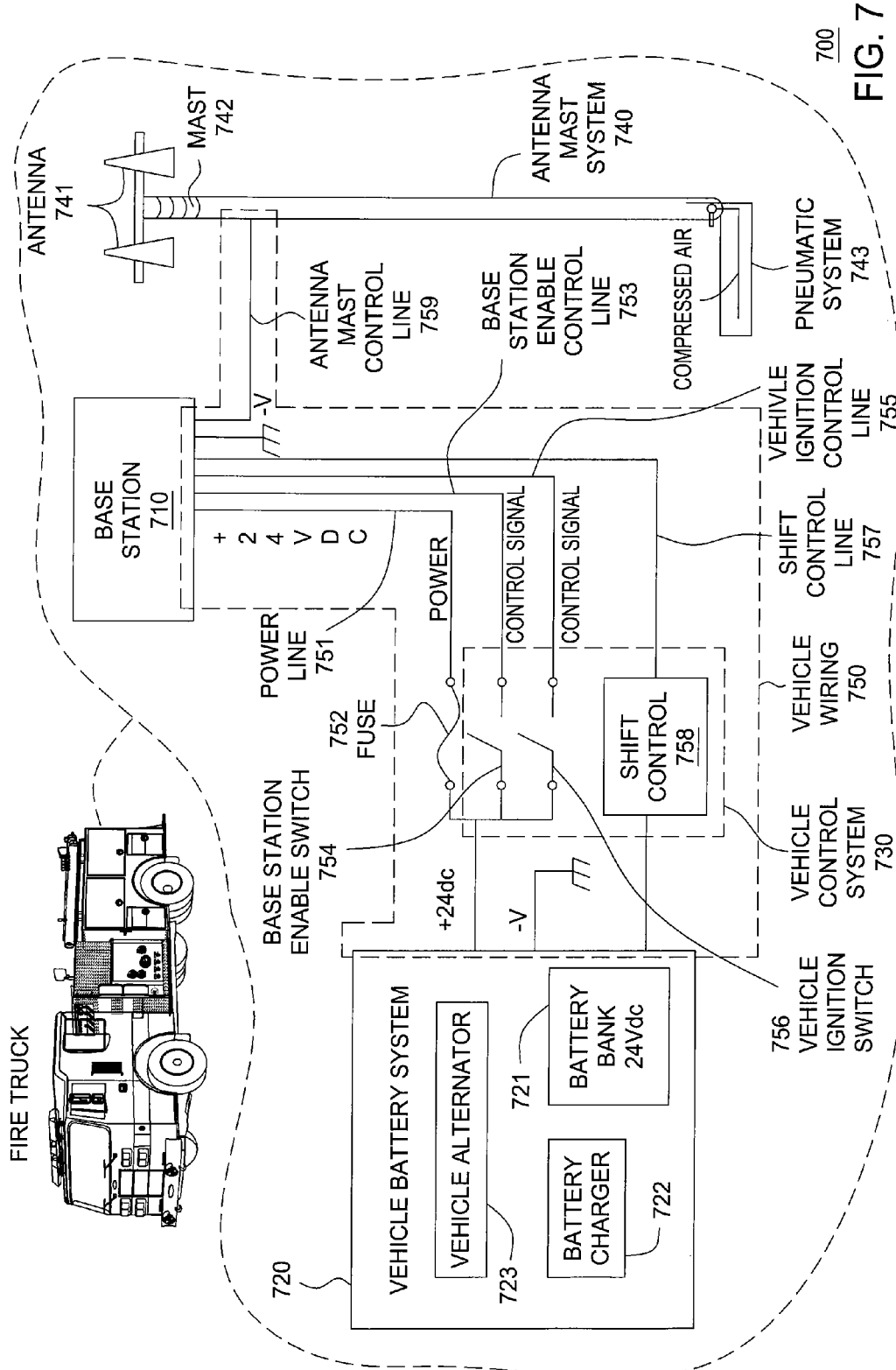
FIG. 7 depicts a high-level block diagram of an emergency response vehicle adapted according to one embodiment of the present invention.

FIG. 7 depicts a high-level block diagram of an emergency response vehicle adapted according to one embodiment of the present invention. As depicted in FIG. 7, emergency response vehicle 700 of FIG. 7 includes a base station 710, a vehicle battery system 720, a vehicle control system 730, and a vehicle antenna mast system 740. The base station 710 receives control signals from each of vehicle battery system 720, vehicle control system 730, and vehicle antenna mast system 740 via vehicle wiring 750. The base station 710 receives power from vehicle battery system 720 via vehicle wiring 750.

As depicted in FIG. 7, the vehicle battery system 720, vehicle control system 730, and antenna mast system 740 are each coupled to base station 710. The vehicle battery system 720 is coupled to base station 710 via vehicle wiring 750 for providing power to base station 710. The vehicle control system 730 is coupled to base station 710 via vehicle wiring 750 for providing control signals to base station 710. The vehicle antenna mast system 740 is coupled to base station 710 via vehicle wiring 750 for providing control signals to base station 710.

The vehicle battery system 720 includes a battery bank 721, a battery charger 722, and a vehicle alternator 723. The battery bank 721 includes batteries which may be used to power vehicle 700, including different systems of vehicle 700. The battery charger 722 enables vehicle 700 to be plugged into a power source (e.g., at the emergency station) in order to recharge the batteries of battery bank 721. The vehicle alternator 723 charges the battery bank 721 and powers the electric system of vehicle 700 when vehicle 700 is running.

The vehicle control system 730 provides a dashboard-based interface by which emergency personnel may operate the emergency response vehicle (and, optionally, the base station). The vehicle control system 730 controls at least a portion of the vehicle wiring system 750 for controlling control signals that are provided to base station 710.

The vehicle wiring 750 include a fuse 752 and associated power line 751 coupling fuse 752 to base station 710.

The vehicle wiring 750 includes a base station enable switch 754 that is controlled by a base station enable control (omitted) which forms part of the vehicle control system 730 of emergency response vehicle 700. The base station enable control enables emergency personnel to manually control whether or not the base station is maintained in a standby state. The base station enable switch 754 is coupled to base station 710 via a base station enable control line 753.

The vehicle wiring 750 includes a vehicle ignition switch 756 that is controlled by a vehicle ignition (omitted) which forms part of the vehicle control system 730 of emergency response vehicle 700. The ignition enables emergency personnel to turn the emergency response vehicle on and off. The vehicle ignition switch 756 is coupled to base station 710 via a vehicle ignition control line 755.

The vehicle wiring 750 includes a vehicle shift controller 758 that is controlled by a shifter (omitted) which forms part of the vehicle control system 730 of emergency response vehicle 700. The shifter enables emergency personnel to engage and disengage the transmission and to engage or disengage the power take-off. The vehicle shift controller 758 is coupled to base station 710 via a vehicle shifter control line 757.

The fuse 752 is a direct power coupling from vehicle battery system 720 to base station 710 via an associated power line 751. The base station receives power from vehicle battery system 720 via: (1) fuse 752 and associated power line 751 and (2) one or both of the base station enable switch 754 and associated base station enable control line 753 or vehicle ignition switch 756 and associated vehicle ignition control line 755. The powering of base station 710 by vehicle battery system 720 using vehicle wiring 750 is described in additional detail below.

The base station enable control line 753 is a coupling from base station enable switch 754 (which is controlled via vehicle control system 730) to base station 710. When the base station enable of vehicle 700 is OFF, base station enable switch 754 is open, thereby preventing base station 710 from receiving a control signal from the base station enable switch 754 via base station enable control line 753 (i.e., the base station detects that the current operational state of the base station enable control system is OFF). When the base station enable of vehicle 700 is ON, base station enable switch 754 is closed, thereby enabling base station 710 to receive a control signal from base station enable switch 754 via base station enable control line 753 (i.e., the base station detects that the current operational state of the base station enable control system is ON).

The vehicle ignition control line 755 is a coupling from vehicle ignition switch 756 (which is controlled via the vehicle control system 730) to base station 710. When the vehicle ignition of vehicle 700 is OFF, vehicle ignition switch 756 is open, thereby preventing base station 710 from receiving a control signal from the vehicle ignition (i.e., the base station detects that the current operational state of the vehicle ignition is OFF). When the vehicle ignition of vehicle 700 is ON, vehicle ignition switch 756 is closed, thereby enabling base station 710 to receive a control signal from the vehicle ignition (i.e., the base station detects that the current operational state of the vehicle ignition is ON).

The shift control line 757 is a coupling from shift controller 758 (which is controlled via the vehicle control system 730) to base station 710. The shift controller 758 and shift control line provide a power take-off control signal to base station 710 (i.e., from which base station 710 may determine the current operational state of the power take-off, e.g., whether the power take-off is currently ENGAGED or DISENGAGED). The shift controller 758 and shift control line may also provide a transmission control signal to base station 710 (i.e., from which base station 710 may determine the current operational state of the transmission, e.g., whether the transmission is currently ENGAGED or DISENGAGED).

As depicted in FIG. 7, fuse 752, base station enable switch 754, and vehicle ignition switch 756, and are each coupled to vehicle battery system 720 in parallel with each other. Similarly, power line 751, base station enable control line 753, and vehicle ignition control line 755 are each in parallel with each other. As such, since fuse 752 and associated power line 754 always provide power from vehicle battery system 720 to base station 710, and base station enable switch 754 and associated base station enable control line 753 are in parallel with vehicle ignition switch 756 and associated vehicle ignition control line 755, the base station enable switch 754 and vehicle ignition switch 756 operate to provide an OR logic function for switching the base station from INACTIVE to STANDBY and operate to provide an AND logic function for switching the base station from STANDBY to INACTIVE.

In other words, in the embodiment of FIG. 7, as long as either base station enable switch 754 is closed or vehicle ignition switch 756 is closed, base station 710 is powered on in the STANDBY or ACTIVE state via a circuit including vehicle battery system 720, fuse 752, power line 751, base station 710, a return control line (i.e., either base station enable control line 753 or vehicle ignition control line 755), and a return switch (i.e., either base station enable switch 754 or vehicle ignition switch 756, respectively). Similarly, base station enable switch 754 and vehicle ignition switch 756 both must be open in order for base station 710 to be powered down in the INACTIVE state.

The antenna mast system 740 includes an antenna 741 (or multiple antennas), a mast 742, and a pneumatic system 743. The antenna is the antenna for base station 710. The antenna 741 is mounted on mast 742. The mast 742 (and, thus, antenna 741) may be raised and lowered by pneumatic system 743.

The vehicle antenna mast system 740 is coupled to base station 710 using an antenna mast control line 759 by which base station 710 may monitor the position of the antenna (and/or mast), thereby enabling base station 710 to determine whether the current operational state of the vehicle antenna mast system is UNDEPLOYED or DEPLOYED.

In one embodiment, when antenna 741 (or the mast 742) is below a threshold height, base station 710 determines that the current operational state of vehicle antenna mast system 740 is UNDEPLOYED, and when antenna 741 (or the mast 742) is above a threshold height, base station 710 determines that the current operational state of vehicle antenna mast system 740 is DEPLOYED.

Although primarily described with respect to using height to determine the operational state of vehicle antenna mast system 740, other conditions may be used to inform base station 710 of the current operational state of vehicle antenna mast system 740 (e.g., antenna mast system 740 is only deemed to be DEPLOYED when antenna 742 is fully extended, antenna mast system 740 is deemed to be DEPLOYED when antenna 742 is at least partially extended, and the like).

Although primarily depicted and described with respect to one specific implementation of a vehicle including a base station where the operational state of the base station may be controlled based on the operational state of the vehicle, the operational state of the base station may be controlled based on the operational state of the vehicle using various other implementations of the vehicle.

Although primarily depicted and described with respect to controlling the operational state of a base station deployed on an emergency response vehicle having a shift control system that supports a power take-off drive, the present invention may be implemented for vehicles that do not have a shift control system that supports a power take-off drive. In such embodiments, for vehicles that do not have a shift control system that supports a power take-off drive, a switch to manually enable this operational mode can be provided.

Although primarily depicted and described with respect to one base station control system providing vehicle system monitoring functions and base station control functions, such functions may be provided using one or more additional control systems (e.g., implemented as part of the base station, implemented on the vehicle, and the like, as well as various combinations thereof). In one embodiment, for example, one controller may be used for monitoring systems of the vehicle and another controller may be used for controlling the operational state of the base station. In another embodiment, for example, separate control systems may be used for monitoring different systems of the vehicle, respectively.

Although primarily depicted and described with respect to implementing a base station control system using specific functional elements, the base station control system may be implemented using fewer or more functional elements, or using a different configuration of functional elements. In one embodiment, for example, fewer functional elements may be used for monitoring the systems of the vehicle. In another embodiment, for example, additional functional elements may be used for controlling the operational state of the base station.

In other words, control systems of the vehicle depicted and described with respect to FIG. 7 may be implemented using different numbers and/or combinations of control systems and/or functional elements of the control system depicted and described with respect to FIG. 7 may be implemented using different numbers and/or configurations of functional elements. Thus, the present invention is not intended to be limited by the exemplary base station control system depicted and described herein with respect to FIG. 7.

Although primarily depicted and described with respect to detecting transitions between operational states of an emergency response vehicle and using detected transitions between operational states of an emergency response vehicle to trigger transitions between operational states of a base station mounted on the emergency response vehicle, the present invention is not intended to be limited to such specific control.

For example, a controller according to one embodiment of the present invention may detect that the emergency response vehicle is in a particular operational state and perform a predetermined action, such as transitioning a base station to a corresponding operational state, setting a base station to a corresponding operational state, and the like, as well as various combinations thereof.

Although primarily depicted and described herein with respect to mappings between specific numbers, types, and combinations of operational states supported by an emergency response vehicle and specific numbers, types, and combinations of operational states supported by a base station mounted on the emergency response vehicle, various other mappings may be supported depending on various factors (e.g., depending on the type of emergency response vehicle, depending on the type of communications node mounted on the emergency response vehicle, and the like, as well as various combinations thereof).

Although primarily depicted and described with respect to specific types of emergency response vehicles, the present invention may be used to control base station activation for base stations mounted on other emergency response vehicle. Although primarily depicted and described with respect to emergency response vehicles, the present invention may be used to control base station activation for base stations mounted on other types of vehicles, including non-emergency vehicles. Although primarily depicted and described with respect to controlling the activation of base stations mounted on vehicles, the present invention may be used to control activation of other types of communications nodes which may be mounted on vehicles.

As such, the present invention described herein is not intended to be limited to the example systems, operational states, and operational state transitions of the described vehicles, to the example operational states and operational state transitions of the described communications nodes, to the described vehicles, or to the described communications nodes.

Figure 8:
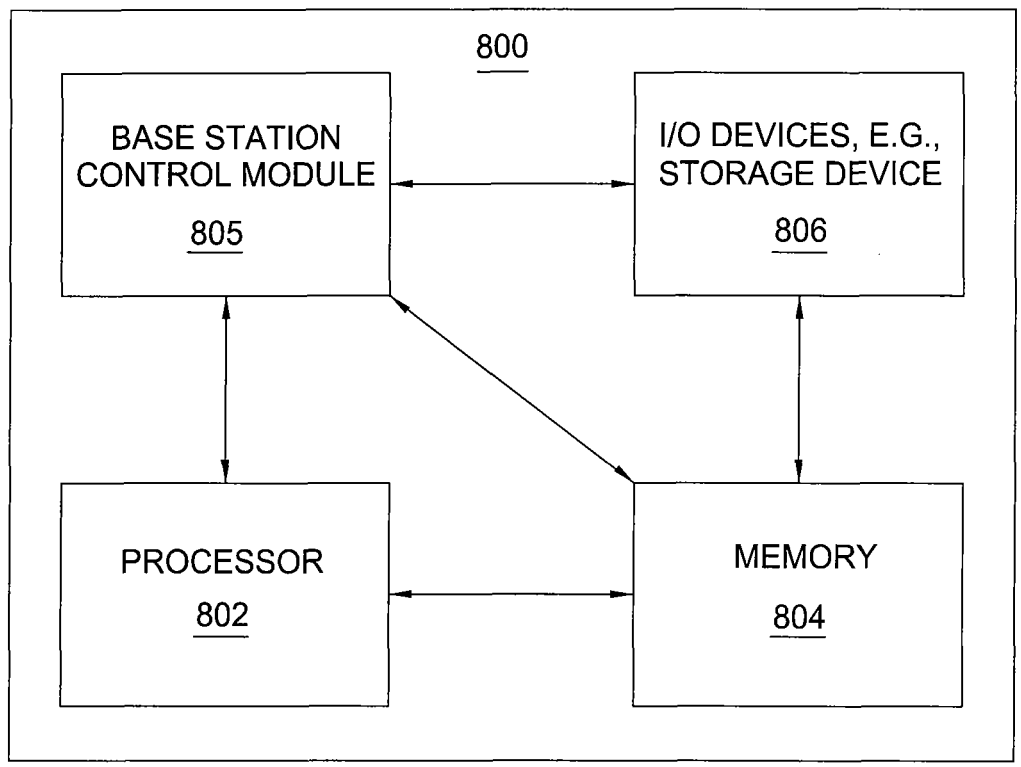
FIG. 8 depicts a high-level block diagram of a general-purpose computer suitable for use in performing the functions described herein.

FIG. 8 depicts a high-level block diagram of a general-purpose computer suitable for use in performing the functions described herein. As depicted in FIG. 8, system 800 comprises a processor element 802 (e.g., a CPU), a memory 804, e.g., random access memory (RAM) and/or read only memory (ROM), a base station control module 805, and various input/output devices 806 (e.g., storage devices, including but not limited to, a tape drive, a floppy drive, a hard disk drive or a compact disk drive, a receiver, a transmitter, a speaker, a display, an output port, and a user input device (such as a keyboard, a keypad, a mouse, and the like)).

It should be noted that the present invention may be implemented in software and/or in a combination of software and hardware, e.g., using application specific integrated circuits (ASIC), a general purpose computer or any other hardware equivalents. In one embodiment, the present base station control process 805 can be loaded into memory 804 and executed by processor 802 to implement the functions as discussed above. As such, base station control process 805 (including associated data structures) of the present invention can be stored on a computer readable medium or carrier, e.g., RAM memory, magnetic or optical drive or diskette, and the like.

Although primarily depicted and described herein with respect to using rapidly deployable nodes (such as 911-NOW nodes depicted and described herein) to deploy a wireless network in emergency response situations, rapidly deployable nodes may be used to deploy a wireless network in various other situations. In one embodiment, rapidly deployable nodes may be used in large-crowd environments. For example, rapidly deployable nodes may be deployed during large-crowd events, such as sporting events (e.g., in a city hosting the Super Bowl, in a city hosting the Olympics, and the like), concerts, and the like. In one embodiment, rapidly deployable nodes may be used as a rapid replacement network for commercial cellular networks (i.e., to replace existing network infrastructure while such infrastructure is unavailable). In one embodiment, rapidly deployable nodes may be used in military environments (e.g., to form a rapidly deployable network on the battlefield or in other situations).

Therefore, rapidly deployable nodes according to the present invention are useful for various other applications in addition to emergency response applications, and, thus, may be deployed in various other situations in addition to emergency situations. Thus, the term "emergency site", which is used herein to denote the geographical location in which one or more rapidly deployable nodes may be deployed to form a wireless network, may be more commonly referred to as a "network site" (i.e., the site at which the rapidly deployable wireless network is deployed to support wireless communications). Similarly, other terms primarily associated with emergency applications may be referred to more generally depending upon the application in which rapidly deployable nodes are deployed. In other words, any number of rapidly deployable nodes according to the present invention may be deployed to any geographical location to form a wireless network for any reason.

Although primarily depicted and described with respect to rapidly deployable networks, the present invention may be used to provide base station activation for any type of base station deployed in any type of network. Although primarily depicted and described with respect to specific wireless transmission technologies (e.g., EV-DO), the present invention may be used to provide base station activation for any wireless transmission technology (e.g., UMTS, HSDPA, WiMAX, and the like). Although primarily depicted and described with respect to activating base stations, the present invention may be used to activate any type of wireless transmission equipment requiring equipment activation activities (e.g., warming of a power amplifier, setting of configuration parameters, and the like) to be performed before the wireless transmission equipment provides wireless communications services. Thus, the present invention is not intended to be limited by the type of wireless network (or wireless transmission technology), type of wireless transmission equipment, or other specific implementations depicted and described herein.

It is contemplated that some of the steps discussed herein as software methods may be implemented within hardware, for example, as circuitry that cooperates with the processor to perform various method steps. Portions of the present invention may be implemented as a computer program product wherein computer instructions, when processed by a computer, adapt the operation of the computer such that the methods and/or techniques of the present invention are invoked or otherwise provided. Instructions for invoking the inventive methods may be stored in fixed or removable media, transmitted via a data stream in a broadcast or other signal bearing medium, and/or stored within a working memory within a computing device operating according to the instructions.

Although various embodiments which incorporate the teachings of the present invention have been shown and described in detail herein, those skilled in the art can readily devise many other varied embodiments that still incorporate these teachings.

What is claimed is:

1. An apparatus, comprising:
   a processor and a memory communicatively connected to the processor, the processor configured to:
      monitor an operational state of a vehicle having a wireless communication device mounted thereon, wherein the wireless communication device comprises a wireless access interface configured to support wireless access to the wireless communication device by a plurality of wireless user devices and configured to support communications by the wireless user devices via the wireless communication device; and control an operational state of the wireless communication device based on the operational state of the vehicle.

2. The apparatus of claim 1, wherein the processor is configured to control the operational state of the wireless communication device by:

switching the operational state of the wireless communication device from a first state to a second state based on the operational state of the vehicle.

3. The apparatus of claim 1, wherein the processor is configured to control the operational state of the wireless communication device by:

switching the operational state of the wireless communication device from a first state to a second state based on a determination that the operational state of the vehicle switches from a first state to a second state.

4. The apparatus of claim 1, wherein the processor is configured to control the operational state of the wireless communication device by:

switching the operational state of the wireless communication device from an inactive state to a standby state based on a determination that an ignition of the vehicle switches from OFF to ON.

5. The apparatus of claim 1, wherein the processor is configured to control the operational state of the wireless communication device by:

switching the operational state of the wireless communication device from a standby state to an active based on a determination that the vehicle is parked and a determination that an antenna mast of the vehicle is deployed.

6. The apparatus of claim 5, wherein the determination that the vehicle is parked is based on a determination that a power takeoff of the vehicle switches from disengaged to engaged.

7. The apparatus of claim 1, wherein the processor is configured to control the operational state of the wireless communication device by:

switching the operational state of the wireless communication device from an active state to a standby state based on at least one of a determination that the vehicle is not parked or a determination that an antenna mast of the vehicle is not deployed.

8. The apparatus of claim 7, wherein the determination that the vehicle is not parked is based on a determination that a power takeoff of the vehicle switches from engaged to disengaged.

9. The apparatus of claim 1, wherein the processor is configured to control the operational state of the wireless communication device by:

switching the operational state of the wireless communication device from a standby state to an inactive state based on a determination that an ignition of the vehicle switches from ON to OFF.

10. The apparatus of claim 1, wherein the processor is configured to control the operational state of the wireless communication device by:

switching the operational state of the wireless communication device from a standby state to an inactive state based on an ignition of the vehicle being OFF and an enable switch being OFF.

11. The apparatus of claim 1, wherein the processor is configured to control the operational state of the wireless communication device by:

switching the operational state of the wireless communication device from a first state to a second state based on at least one of a control signal from a controller or an enable switch being activated.

12. A method, comprising:
using a processor and a memory for:

monitoring an operational state of a vehicle having a wireless communication device mounted thereon, wherein the wireless communication device comprises a wireless access interface configured to support wireless access to the wireless communication device by a plurality of wireless user devices and configured to support communications by the wireless user devices via the wireless communication device; and controlling an operational state of the wireless communication device based on the operational state of the vehicle.

13. The method of claim 12, wherein controlling the operational state of the wireless communication device comprises:

switching the operational state of the wireless communication device from a first state to a second state based on the operational state of the vehicle.

14. The method of claim 12, wherein controlling the operational state of the wireless communication device comprises:

switching the operational state of the wireless communication device from a first state to a second state based on a determination that the operational state of the vehicle switches from a first state to a second state.

15. The method of claim 12, wherein controlling the operational state of the wireless communication device comprises:

switching the operational state of the wireless communication device from an inactive state to a standby state based on a determination that an ignition of the vehicle switches from OFF to ON.

16. The method of claim 12, wherein controlling the operational state of the wireless communication device comprises:

switching the operational state of the wireless communication device from a standby state to an active based on a determination that the vehicle is parked and a determination that an antenna mast of the vehicle is deployed.

17. The method of claim 12, wherein the determination that the vehicle is parked is based on a determination that a power takeoff of the vehicle switches from disengaged to engaged.

18. The method of claim 12, wherein controlling the operational state of the wireless communication device comprises:

switching the operational state of the wireless communication device from an active state to a standby state based on at least one of a determination that the vehicle is not parked or a determination that an antenna mast of the vehicle is not deployed.

19. The method of claim 18, wherein the determination that the vehicle is not parked is based on a determination that a power takeoff of the vehicle switches from engaged to disengaged.

20. The method of claim 12, wherein controlling the operational state of the wireless communication device comprises:

switching the operational state of the wireless communication device from a standby state to an inactive state based on a determination that an ignition of the vehicle switches from ON to OFF.

21. The method of claim 12, wherein controlling the operational state of the wireless communication device comprises:

switching the operational state of the wireless communication device from a standby state to an inactive state based on an ignition of the vehicle being OFF and an enable switch being OFF.

22. The method of claim 12, wherein controlling the operational state of the wireless communication device comprises:
   switching the operational state of the wireless communication device from a first state to a second state based on at least one of a control signal from a controller or an enable switch being activated.

23. A system, comprising:
   a wireless communication device comprising a wireless access interface configured to support wireless access to the wireless communication device by a plurality of wireless user devices and configured to support communications by the wireless user devices via the wireless communication device, wherein the wireless communication device is configured to be mounted on a vehicle; and
   a controller configured to control an operational state of the wireless communication device based on an operational state of the vehicle.

24. The system of claim 23, wherein the wireless communication device further comprises at least one of:
   a wireless mesh interface configured to support wireless communications between the wireless communication device and a second wireless communication device, the second wireless communication device comprising a second wireless access interface configured to support wireless communications of a second plurality of wireless user devices; and
   a wireless backhaul interface configured to support wireless communications between the wireless communication device and a wireless access device of a wireless network infrastructure.

* * * * *